April 12, 1966     S. B. ALLEN     3,245,163
LUMINOUS DISPLAY DEVICE
Original Filed July 10, 1959     4 Sheets-Sheet 1
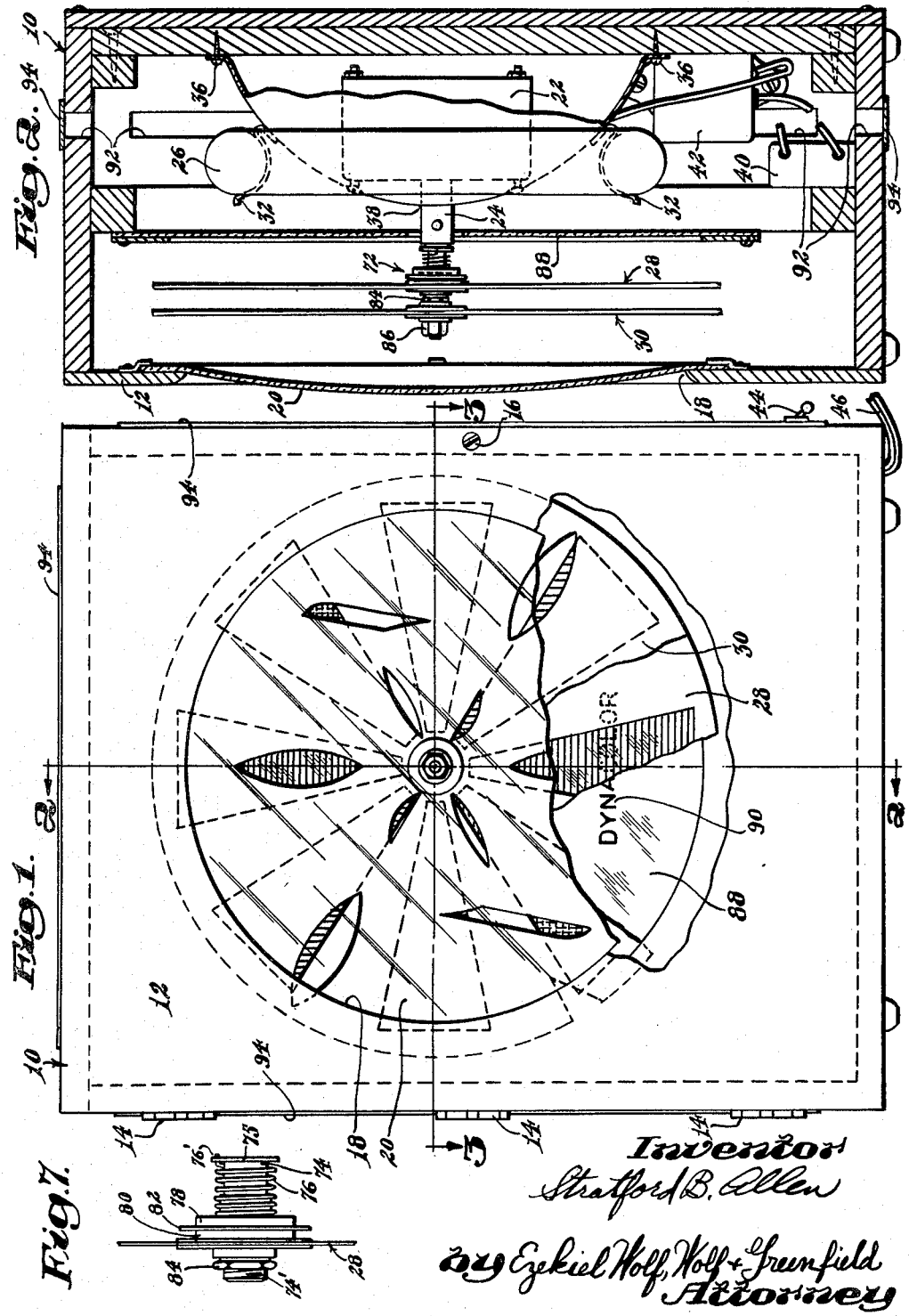
Inventor
Stratford B. Allen
by Ezekiel Wolf, Wolf & Greenfield
Attorney

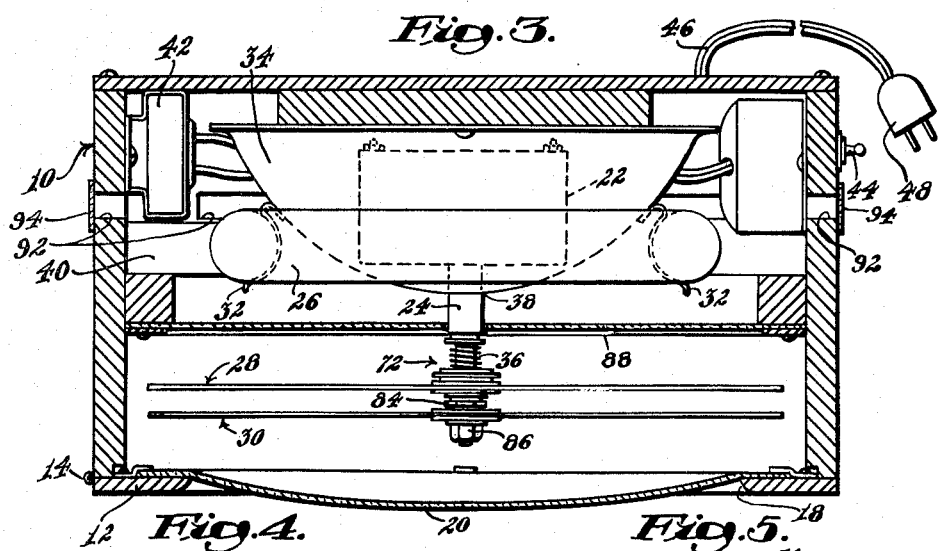

Stratford B. Allen
INVENTOR.

April 12, 1966  S. B. ALLEN  3,245,163
LUMINOUS DISPLAY DEVICE
Original Filed July 10, 1959  4 Sheets-Sheet 4

Stratford B. Allen
INVENTOR.

United States Patent Office 3,245,163
Patented Apr. 12, 1966

3,245,163
LUMINOUS DISPLAY DEVICE
Stratford B. Allen, Sharon, Mass.
Original application July 10, 1959, Ser. No. 827,415, now Patent No. 3,080,474, dated Mar. 5, 1963. Divided and this application Mar. 21, 1962, Ser. No. 183,986
4 Claims. (Cl. 40—34)

This invention relates to improvements in luminous display apparatus of the general type disclosed in Newhall Patent No. 2,281,790, granted May 5, 1942, wherein changing patterns in colors are produced within a display portion of the apparatus. The invention improves upon the said patented apparatus by eliminating the need for rotating the light source, and by making it more practically feasible to substitute one general plane of the changing light patterns for another, and by introducing a stroboscopic effect in the rotating patterns and otherwise generally improving the effectiveness and adaptability of luminous display devices. This application is a division of application Serial No. 827,415, filed July 10, 1959, now Patent No. 3,080,474, dated March 5, 1963.

Prior comparable luminous display apparatus, such as the apparatus of the mentioned Newhall patent, have attained the displayed color patterns and effects by rotating a series of variously colored lamps behind a masking disk having suitable openings therein, the lamps and disks being mounted for rotation at different speeds to produce changing light patterns when one is looking at the display portion of the apparatus. Rotation of the lamps, or other light source, involves rotation of considerable weights and requires use of collection rings, brushes, or the like, for maintaining the electric circuit or circuits to the lamps. Also, heretofore, it has not been possible to substitute one masking disk for another, for changing the plan of light patterns, without losing the predetermined proper torque setting which determines the speed of rotation of the masking disk relative to the speed of rotation of the lamps, which has made it requisite that this setting be precisely re-established following each change of masking disks. Another practical objection to the prior comparable luminous display devices has resulted from the need for the mentioned collector rings, brushes, or the like, which create serious interference with radio and television reception.

The primary feature of the present invention is to provide a display device in which sharply peak pulses are provided in a light source of the white light type for activating the phosphor coating of the lamp to produce equivalent pulses of high intensity on each half cycle resulting in a decidedly stroboscopic effect in the rotating patterns from the color and pattern disk. Thus, in addition to the generally circular arrangements of varying color and diameter, sharply defined bright spoke-like flashes and a variety of color shapes of high definition are added to the effect with there also being standing non-circular and radial forms taking shape while the colors are changing due to rotation of the pattern disk at a multiple of the line frequency thus adding to the attention getting features of the device.

It is among the objects of the present invention to provide luminous display apparatus wherein the changing color effects and patterns are produced by white or nearly white light diffused from a stationary source and transmitted through colored transparent areas of a relatively light weight disk which is rotated behind a rotating perforated masking disk, the two said disks rotating at different speeds to create the changing color effects and patterns.

Another object of the invention is to provide a luminous display apparatus wherein changing color effects and patterns are produced by white or nearly white light diffused and transmitted through a plurality of differentially rotating disks whose relative speeds of rotation may be varied at will by adjustment of means which is unaffected by removal and substitution of disks for changing the color patterns.

A further object of the invention is to provide a luminous display apparatus which may be entirely free of frictionally coacting electrical contacts and connections, whereby operation of the apparatus does not interfere with radio and television reception in the vicinity of the apparatus.

It is, moreover, my purpose, and object generally to improve the structure, efficiency and effectiveness of luminous display apparatus, and especially such wherein changing light effects and patterns are produced at a display portion of the apparatus.

In the accompanying drawings:

FIG. 1 is a front elevation of luminous display apparatus embodying features of the invention, portions being broken away to show interior elements;

FIG. 2 is a cross-sectional view on line 2—2 of FIG. 1, but showing the lamp and the filtering and masking disks in elevation;

FIG. 3 is a cross-sectional view on line 3—3 of FIG. 1, but with the lamp and disks in elevation;

FIG. 4 is a face view of the masking disk;

FIG. 5 is a front face view of the color filtering disk;

FIG. 6 is an exploded view, with some parts in cross-section, of the means for mounting the filtering and masking disks, including the adjustable-torque clutch;

FIG. 7 is an elevational view of the assembled clutch and filtering disk unit which may be adjusted prior to mounting it on the motor shaft;

Figure 8:
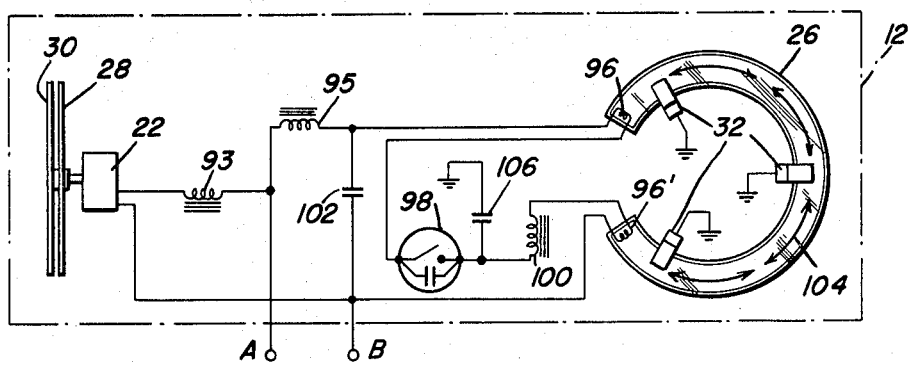
FIG. 8 is a schematic electrical diagram of the device of the present invention.

Referring to the drawings, the illustrated embodiment of the invention has a casing 10 whose front wall 12 is openable for getting access to the interior of the casing. Wall 12 conveniently may be mounted on hinges 14 with a single screw 16, or the like, for securing it closed. A relatively large opening 18 is provided in wall 12 through which the color effects and patterns may be viewed. Preferably, a transparent element 20 serves as a window closing the wall opening 18.

A small electric motor 22 is suitably mounted within the casing 10 with its shaft 24 extending toward the wall opening 18 at a location which is generally centered with respect to the opening. The light source is a lamp 26 which is suitably mounted to be stationary within the casing 10 in substantially spaced relation to the window 20 in wall 12. A color disk 28 and a masking disk 30 are mounted in spaced relation on the motor shaft 24 between the lamp 26 and window 20.

Lamp 26 is preferably but not necessarily circular in form and is a standard type of fluorescent lamp having a generally white light emitting phosphor activated by the mercury-argon gaseous arc within the lamp envelope. The particular lamp shown is a tubular and generally circular fluorescent lamp which is removably retained in suitable clips or holders 32 on the exterior of a hollow dome-shaped support 34 which may be rigidly mounted on the rear wall of casing 10, as by the screws 36. The motor 22 conveniently may be mounted on this same support 34 interiorly thereof, with its shaft extending out through an opening at 38 in the wall of the support. The auxiliary devices employed for operation of a fluorescent or other gaseous arc lamp are indicated at 40, 42 including a control switch 44, and a conductor cord 46 is equipped with a usual plug 48 for plugging the apparatus into any available 115 v. alternating electric circuit.

Obviously, more than one lamp 26 may be employed if desired.

The motor 22 may be a small fractional horsepower motor which is required to rotate only the relatively lightweight disks 28, 30 and their appurtenances on shaft 24. For example, in a luminous display apparatus having disks 28, 30 of diameter up to 14 inches, 1/100 horsepower motor 22 has been found to be efficiently adequate. In apparatus of larger sizes having disk diameters from 15 inches up to 22 inches, a 1/70 horsepower motor may be required. Apparatus of still larger sizes having disk diameters above 22 inches may require a 1/40 horsepower motor for driving the disks.

It is a feature of the invention that the color effects and patterns viewable through the window 20 are produced by white or nearly white light from lamp 26, the light being transmitted through the color disk 28 and through openings in masking disk 30, both of which disks are rotated by the motor 22 but at changing relative speeds.

Color disk 28, as best seen in FIG. 5, comprises an opaque body having a series of uniformly shaped angular openings 50 disposed uniformly about the axis of the disk. Each opening 50 is covered by a transparent sheet having one of the primary colors red, green, yellow or blue. As represented, a counterclockwise sequence of transparent sheets 52, 54, 56, 58 have the colors red, green, yellow and blue, respectively, around one half of the disk, and this sequence is duplicated around the other half of the disk. However, although this disclosed arrangement and utilization of only primary colors presently is considered preferable, it should be understood that numerous color combinations and arrangements employing primary and/or non-primary colors may be provided, if desired. Also, the shapes of the transparent areas of the disk 28 may be varied as desired.

The masking disk 30, as best seen in FIG. 4, comprises an opaque body having variously arranged openings 60, 62, 64, 68 therein, and having oppositely disposed V-notches 70 at its periphery. The number, size, shape, arrangement and relationship of the openings in disk 30 may be varied in any of a multiplicity of ways to provide a great variety of different coacting effects in conjunction with the associated filtering disk 28. Preferably, however, the masking disk openings will be selected as to shape, size and number to attain a general symmetry which presently is considered desirable. Ordinarily, a plurality or multiplicity of different masking disks 30 will be provided with each display apparatus and any one may be quickly substituted for another to attain substantially different color effects and patterns.

Automatic continually changing color effects and patterns when any particular masking disk 30 is associated with color disk 28 on the motor shaft, are attached through the medium of a spring clutch mechanism indicated generally at 72 and best seen in FIGS. 6 and 7. This clutch may be selectively set to apply a predetermined amount of driving torque to the color disk 28 so that it will slip, more or less, relatively to the masking disk 30 which becomes fixed to the motor shaft.

Referring to FIG. 6, the motor shaft 24 has its outer end portion reduced to provide the smaller diameter portion 25 which has substantial length. The extreme end portion of the shaft is further reduced and threaded as at 25'. A sleeve 74 fits nicely on the reduced portion 25 of shaft 24 and has an annular flange 75 at one end to which one end of a coiled spring 76 is secured, as by being inserted through a hole in the flange as shown at 76', in which case the adjacent portion of shaft 24 will be annularly reduced at 24' to accommodate the projecting end of the spring. The spring is relatively loosely coiled about sleeve 74.

One clutch member 78 is rotatably and slidably mounted on sleeve 74 and has an annular portion 79 extending toward the sleeve flange 75. A plurality of coils at one end portion of the spring 76 are tightened around the annular portion 79 so that this portion of the spring becomes secured to the clutch member 78. Hence, when clutch member 78 is rotated in either direction on sleeve 74 depending upon the direction of a said rotation of member 78, the clutch member becomes pulled or pushed by the spring in directions along sleeve 74.

The other clutch member 80 has the color disk 28 rigidly secured thereto and has an axial hole 81 whereby the clutch member 80 nicely fits on sleeve 74 and is both rotatable and slidable on the sleeve.

Although the clutch members 78, 80 may, if desired, engage directly with each other, it presently is considered preferably to provide an intervening disk element 82, which may be of metal or any other suitable material. This disk element has an axial hole 83 therein whereby it fits rotatably and slidably on sleeve 74 with the clutch members engaging its opposite faces. The end portion of sleeve 74 opposite its flanged end is exteriorly threaded at 74' for reception of a nut 84 which may be manually adjusted on sleeve 74 to attain a predetermined amount of driving torque between the clutch members when the sleeve 74 is clamped to the motor shaft for rotation therewith, the clutch member 78 then being driven through the coil spring 76, and the other clutch member 80 and color disk 28, being driven with more or less slippage at the clutch depending upon the adjustment of nut 84.

After the clutch members 78, 80, disk element 82 and nut 84 have been positioned on sleeve 74 and the sleeve has been mounted on shaft portion 25, the masking disk 30 is positioned on the threaded end portion 74' of sleeve 74, against nut 84, the said disk 30 having an axial hole 31 therein for slidably and rotatably fitting on the threaded portion 74' of the sleeve. A clamping nut 86 then may be screwed on the threaded end 25' of the motor shaft to clamp the masking disk 30 and sleeve 74 between nut 86 and the shoulder 24" of the motor shaft, whereby the masking disk and the sleeve become fixed to the shaft and rotate therewith. The clamping pressure is applied to the sleeve through the adjusting nut 84 and the adjusting nut is thereby maintained against any unintentional rotation on the sleeve during use of the apparatus.

It is an important feature of the invention that all of the elements and members on sleeve 74, excepting masking disk 30, may be preassembled on the sleeve 74 so that the sleeve and the elements and members thereon may constitute an assembled unit (FIG. 7) which may be slipped as a unit on the reduced portion 25 of motor shaft 24. The nut 84 may be preliminarily adjusted on sleeve 74, at the factory if desired, to provide an assembled clutch unit which will have a predetermined desired amount of driving torque when subsequently mounted on a motor shaft, and this predetermined setting may be preserved unchanged when the apparatus is assembled for use, assuring a proper and efficient constantly changing luminous display without need for critical adjustment of the clutch at the time of assembly. Also important is the fact that, subsequent to initial assembly, masking disks 30 may be interchanged on the motor shaft without disturbing the setting of the clutch unit. Of course, the clutch unit may be adjusted at any time to change the torque setting, by removing the clamping nut 86 and masking disk 30 to get access to adjusting nut 84.

Ordinarily, it will be found desirable to transmit the white or nearly white light from lamp 26 through a translucent white sheet element 88 which may be fixed within the casing 10 between the lamp 26 and the color disk 28. Advertising matter, or any other desired information, may be printed on the front face of sheet element 88, as at 90, and is rendered visible by the light directed through element 88. Actually, the advertising or printed matter is clearly visible and readable in the midst of the changing color designs and patterns seen through the window 20.

All surfaces within the casing 10 rearward of the translucent sheet element 88 desirably will be white to attain maximum reflection of light toward the color disk 28. All surfaces within the casing 10 forward of the sheet element 88 desirably will be black, including both sides of the bodies of disks 28, 30.

In FIG. 8, there is represented in schematic form the orientation in which the drive motor 22 and the associated rotating disks 28 and 30 are connected to a usual source of sinusoidal alternating current at 120 volts as generally supplied by various public utilities. A series inductance 93 serves to control the limit of speed of rotation of the non-synchronous motor 22 within a range suitable for proper and effective performance of the color display when the motor speed varies with the small variations in line voltage.

The lamp 26 is of the standard type fluorescent lamp which is provided with white light emitting phospor of substantially white light emitting phosphor activated by the mercury-argon gaseous arc with the lamp envelope and this serves as the light source. The supporting clips 32 are generally of conventional nature and are commonly employed with lamps of this type and they are grounded to the casing 12 in the usual manner. A standard lamp ballast 95 is connected in series with one line terminal A and lamp filament 96 which in turn is series connected to the standard type neon starter 98 in series with an inductance 100 and the opposite lamp filament 96'. The other lamp filament 96' is in series to the opposite line terminal B. A capacitor 102 is connected between the junction of the lamp ballast 94 and the filament 96 in shunt with the arc path 104 to the opposite filament 96'. A second capacitor 106 having appreciably smaller value of capacitance is connected between the junction of the starter 98 and the inductance 100 with the other terminals of the capacitor 106 being connected to the casing 12.

In operation, when the start element 98 makes contact, the filaments 96 and 96' are thrown in series and become heated, partially ionizing the argon-mercury gas contained in the lamp 26. When the starter 98 breaks the series filament 96, 96' and ballast 95 circuit, the ballast magnetic field collapses, generating a momentarily high potential between the filaments through the partially ionized arc path 104 causing it to become continuously conductive and incandescent, thereby activating the phosphor to luminescence.

Ordinarily the above would be the usual operation of a fluorescent lamp in its conventional associated circuit. However, the shunt capacitor 102 connected across the arc path 104 which is required to produce peaked energy pulses in the lamp 26 to make possible the desired stroboscopic characteristics of this device, tends to render conventional starting either uncertain or impossible. This is due to the fact that the value of the shunt capacitance 102 normally required to produce the maximum stroboscopic effect lowers the potential across the arc path below the requisite arc starting voltage.

It is because of the above stated condition that the inductance 100 and the relatively low capacitance 106 have been employed as shown in FIG. 8. With this circuit it is now possible to use standard components commonly available for fluorescent lamps to produce the pulsed light source necessary to obtain the desired stroboscopic effects.

In the device described the modified circuit operates conventionally except that now, when the starter element 98 makes contact and the filaments 96, 96' are thrown in series and become heated, partially ionizing the gas in the lamp 26 and then, upon breaking contact, causes the magnetic field in the inductance 100 also to collapse and to generate a potential surge between the grounded clips 32 and the filaments 96, 96', through the already partially ionized gas. This surge further ionizes the gas in the arc path sufficiently to cause an arc to strike between the filaments. The voltage across the starter 98 is thus lowered below its operating value and remains inoperative as long as the lamp arc is maintained.

Figure 9:
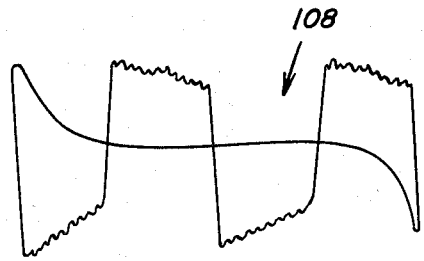
FIG. 9 is a view of an oscillogram of the potentials across an ordinarily operated fluorescent lamp.
Figure 10:
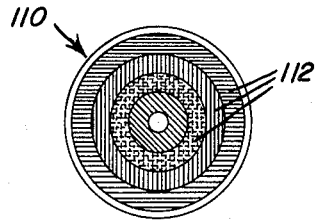
FIG. 10 is a diagrammatic view showing the result of the color patterns when an ordinary operated fluorescent lamp is used as in FIG. 9.

An oscillogram of the potentials across an ordinarily operated fluorescent lamp is shown in FIG. 9. With radially disposed patterns cut in the masking or pattern disk, a light source having this voltage configuration shows little or no stroboscopic effect, particularly with reference to any sharp definition of said radially disposed elements in the pattern 110. Rather, a soft type of expanding and contracting circular arrangements 112 of color changes is produced which, though interesting, are not particularly arresting of attention. The general effect of this type of light source is shown in FIG. 10.

Figure 11:
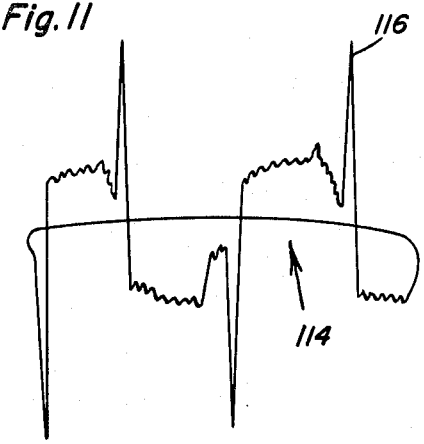
FIG. 11 is an oscillogram of the lamp arc potential employed in the present invention and using the components shown in FIG. 8.
Figure 12:
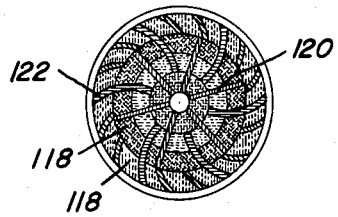
FIG. 12 is a diagrammatic view similar to FIG. 10 but showing the color pattern obtained from the present invention illustrating the radial effect including the circular arrangements of varying color and diameter, sharply defined bright spoke like flashes and a variety of color shapes of high definition.

In this invention, the application of a capacitor 102 across the low voltage argon mercury arc path 104 produces sharply peaked pulses of energy as illustrated by the oscillogram 114 of the lamp arc potential in FIG. 11. These pulses 116 in the incandescent arc activate the phosphor coating of the lamp to produce equivalent light pulses of high intensity on each half cycle resulting in a decidedly stroboscopic effect in the rotating patterns from the color and pattern disks. Thus, in addition to the generally circular arrangements 118 of varying color and diameter, sharply defined bright spoke-light flashes 120 and a variety of color shapes 122 of high definition are added to the effect, as illustrated in FIG. 12. Further, when the pattern disk is rotating at a multiple of the line frequency, standing non-circular and radial forms take shape while the colors are still changing, thus adding to the attention getting features of the device.

The commercial types of starters ordinarily will not start the lamp shunted by the requisite amount of capacitance to produce the above described effects unless the starter circuit has been modified to meet the conditions brought about by use of the shunt, or pulse capacitor.

This modification consists of an inductance 100 and capacitor 106 arranged in the circuit to operate as above described, in which the supporting clips 32 serve to apply the electrostatic pulse potential through the glass envelope to the gas in the arc path 104. With this arrangement standard commercially components can be utilized to produce the required stroboscopic effects, such as progression and regression of patterns, as well as apparently standing patterns, in which use of slight line voltage drifts causing variation in drive motor speeds produce effects not otherwise attainable with ordinary light sources except in conjunction with more complicated mechanical systems.

The present effects are produced with a stationary source of light which avoids the need for rotating lamps and the incidental frictional electrical contacts which, in the prior apparatus, were a source of objectionable interference with radio and television reception. Also, when it became desirable to substitute a different masking disk for the one which had been functioning in the prior apparatus, it became necessary to critically reset the torque or slippage of the new disk relative to the lamp carrying disk. Our improved apparatus employs a color disk clutch unit which may be preassembled and preset to provide a predetermined amount of torque and this setting is preserved without change during any interchange of masking disks. The masking disk becomes secured to the motor shaft to rotate therewith, and the color disk is the one that slips to provide the continually changing color designs and patterns. Hence, by employing a so-called shaded pole motor whose speed is not constant, the pattern changes may be further considerably increased, with unpredictability of the variations serving to hold the attention as well as giving aesthetic pleasure in colors to the beholder.

Figure 13:
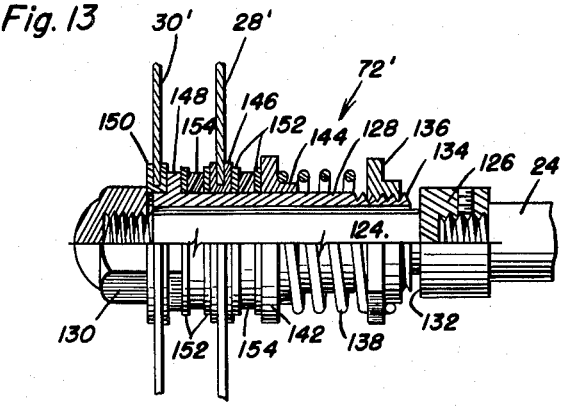
FIG. 13 is a detailed sectional view of a preferred form of clutch mechanism for joining the disks to the motor shaft.
Figure 14:
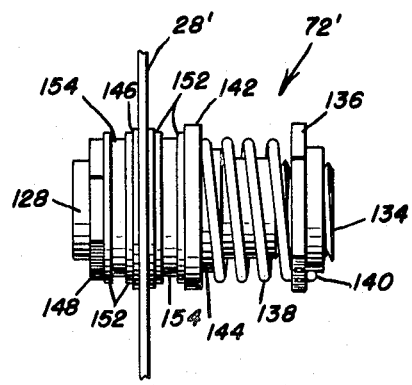
FIG. 14 is an elevational view of the assembled clutch and color disk unit which may be adjusted prior to mounting on the motor shaft.

FIGURES 13 and 14 illustrate a preferred embodiment of the clutch mechanism 72' which includes an extension shaft 124 mounted on the motor shaft 24 by a locked threaded connection 126. A sleeve 128 is held on shaft 124 by nut 130 which holds the sleeve against the abutment 132 formed by connection 126. The sleeve 128 is threaded at one end at 134 and threadedly receives an adjustment nut 136.

A coil spring 138 has one end abutting nut 136 with a longitudinal projecting end 140 of the spring extending through an aperture in the nut 136. A collar 142 is slidably and rotatably mounted on the sleeve 128 and has a cylindrical extension 144 received in and attached to the other end of coil spring 138. The color disk 28' is provided with a central metal grommet 146 journaled on sleeve 128. Also, the sleeve 128 is provided with an integral flange or clutch member 148 adjacent to but spaced from the outer end of the sleeve 128. The outer end of extension 124 is threaded for receiving the clamp nut 130 for locking the masking disk 30' to the sleeve 128 by virtue of clamping a grommet 150 against flange 148. Identical friction disc clutch assemblies are disposed between the flange 148 and grommet 146 and between collar 142 and grommet 146. Each clutch assembly includes a pair of spaced steel washers 152 with a Teflon washer 154 disposed therebetween. These washers provide little or no difference in the "starting" and "running" friction with the coefficient being constant at .04. This provides for less critical adjustment than if other materials are used.

The general operation of this clutch mechanism is similar to the device disclosed in FIGURES 6 and 7.

The disclosed apparatus may be variously employed in conjunction with advertising matter and product displays which may be disposed beside, above, below or in rear of the apparatus. Such associated advertising matter and displays may be effectively lighted and accentuated by white or nearly white light which may diffuse outward from the rear lamp chamber of the apparatus through suitable openings or slots 92 which may be provided for this purpose in the casing side, bottom and top walls, or any of them, as may be desired. The openings or slots 92 preferably will be covered by translucent sheet material 94, which may be white Plexiglas, for example. Light thus diffused through the wall openings or slots 92 will not appreciably affect or reduce the intensity of the light being transmitted forwardly through the disks 28, 30.

The foregoing is considered as illustrative only of the principles of the invention. Further, since numerous modifications and change will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:
1. A display device comprising,
   a display panel,
   a first masking disc having at least first and second portions with different light transmissive properties,
   a second masking disc having at least third and fourth portions with different light transmissive properties,
   means for supporting said first and second masking discs for rotation about a common axis that passes through said display panel so that both masking discs intercept a common ray of light parallel to said common axis for illuminating said display panel,
   means for driving one of said masking discs to impart rotation thereto about said common axis,
   and clutch means having driving and driven contacting surfaces formed of material characterized by a coefficient of starting friction substantially the same as the coefficient of running friction for coupling rotary motion from said one disc to the other while allowing relative angular displacement therebetween at a rate much slower than the angular velocity of both said discs about said common axis, said clutch means comprising,
   a cylindrical supporting member coaxial with said common axis,
   means for supporting said one disc in fixed relationship to said cylindrical supporting member,
   means for supporting said other disc for relative movement between said cylindrical supporting member and said other disc,
   means including a Teflon surface for transmitting angular movement of said cylindrical supporting member about said common axis into angular movement of said other disc about said common axis,
   said cylindrical supporting member being formed with an annular flange,
   said means for supporting said one disc comprising means for urging said one disc against one side of said flange,
   and said means for supporting said other disc comprising an annular Teflon washer separating the other side of said flange from said other disc and means for urging said other disc toward said flange.

2. A display device in accordance with claim 1 wherein said means for urging said other disc toward said flange comprises a second annular Teflon washer with said other disc between said Teflon washers and means including a spring urging said Teflon washers and said other disc toward said flange.

3. A display device in accordance with claim 2 wherein said means including a spring urging said Teflon washers and said other disc toward said flange comprises a first pair of metal annular washers sandwiching said first-mentioned Teflon washer and a second pair of metal annular washers sandwiching said second Teflon washer.

4. A display device in accordance with claim 3 wherein said first and second portions are opaque and translucent respectively,
   said second disc is translucent with segments of different colors,
   and further comprising a source of pulsating light for illuminating said display panel and receiving electrical energy from a pair of power leads,
   and an electric motor receiving energy from said power leads for rotating said cylindrical supporting member.

References Cited by the Examiner

UNITED STATES PATENTS

| | | | |
|---|---|---|---|
| 786,294 | 4/1905 | Joy | 64—30 |
| 1,547,864 | 7/1925 | Etcheto | 40—34 X |
| 1,932,277 | 10/1933 | Kliegl | 40—34 |
| 2,281,790 | 5/1942 | Newhall | 240—10.1 |
| 2,651,530 | 9/1953 | Blydenburgh | 64—30 X |
| 2,707,362 | 5/1955 | Thelander | 64—30 X |
| 2,711,292 | 6/1955 | Taggart | 192—107 |
| 3,003,609 | 10/1961 | Lang | 192—107 |

WALTER A. SCHEEL, *Primary Examiner.*

E. V. BENHAM, JEROME SCHNALL, *Examiners.*